US011463395B1

(12) United States Patent
Maharjan et al.

(10) Patent No.: US 11,463,395 B1
(45) Date of Patent: Oct. 4, 2022

(54) SYSTEM AND METHOD OF PROVIDING NOTIFICATIONS

(71) Applicant: West Corporation, Omaha, NE (US)

(72) Inventors: Sony Maharjan, Omaha, NE (US); Brandon M. Essler, Omaha, NE (US); Prashanth Katakam, Omaha, NE (US); Samira Kharel, Omaha, NE (US); Kaushik Chittam, Omaha, NE (US); Gregory A. Weigner, Bellevue, NE (US)

(73) Assignee: Intrado Corporation, Omaha, NE (US)

( * ) Notice: Subject to any disclaimer, the term of this patent is extended or adjusted under 35 U.S.C. 154(b) by 85 days.

(21) Appl. No.: 16/038,845

(22) Filed: Jul. 18, 2018

(51) Int. Cl.
*H04L 51/224* (2022.01)
*H04M 1/72451* (2021.01)

(52) U.S. Cl.
CPC ...... *H04L 51/224* (2022.05); *H04M 1/72451* (2021.01)

(58) Field of Classification Search
None
See application file for complete search history.

(56) References Cited

U.S. PATENT DOCUMENTS

| | | | | |
|---|---|---|---|---|
| 6,560,318 | B1* | 5/2003 | Spielman | H04M 3/5307 379/67.1 |
| 2005/0144266 | A1* | 6/2005 | Antonelli | H04L 67/26 709/223 |
| 2007/0105536 | A1* | 5/2007 | Tingo | G06Q 30/02 455/414.1 |
| 2010/0227600 | A1* | 9/2010 | Vander Veen | H04M 19/04 455/418 |
| 2016/0164810 | A1* | 6/2016 | Wolz | H04L 51/046 709/206 |
| 2017/0099592 | A1* | 4/2017 | Loeb | H04L 67/303 |
| 2019/0356534 | A1* | 11/2019 | Narayanaswamy | H04L 41/0622 |

* cited by examiner

*Primary Examiner* — Chris Parry
*Assistant Examiner* — Abderrahmen Chouat

(57) ABSTRACT

A method is provided comprising a notification platform computer transmitting a first message to a first end user device requesting selection by the device of a first notification time at which to receive at least one notification. The method also comprises the computer transmitting a second message to a second end user device requesting selection by the second device of a second notification time at which to receive at least one notification. The method comprises the computer receiving a first response to the first message from the first device, the first response advising of a first selection of the first time. The computer receives a second response to the second message from the second device advising of a second selection of a second notification time, the second time differing from the first time.

10 Claims, 4 Drawing Sheets

100

SYSTEM AND METHOD OF PROVIDING NOTIFICATIONS

CROSS REFERENCE TO RELATED APPLICATIONS

None

FIELD OF THE DISCLOSURE

The present disclosure is in the field of sending notifications. More particularly, the present disclosure is in the technical field of providing notifications to recipients that specify notification times and messaging methods and contact points for the receipt of the notifications.

BACKGROUND OF THE DISCLOSURE

Parties receiving automated notification messages generally wish not to be interrupted during their daily activities by such messages unless a bona fide emergency is taking place. The present relentless proliferation of technology has fostered constant daily disruption and invasion of privacy. Receiving some timely notifications is still important, however. Parties need to be reminded about appointments, payment obligations, availability of prescription medications, and scheduling changes associated with transportation arrangements. Recipients prefer not to receive automated notification messages at inconvenient times of day. Nor do they wish to receive such messages on weekends or holidays unless they so direct. Recipients instead prefer to set times at which they are receptive to such messages. Recipients also prefer to specify methods for receiving notifications such that their daily routines are not disrupted.

SUMMARY OF THE DISCLOSURE

In an embodiment, a method of providing notifications is provided. The method comprises a notification platform computer transmitting a first message to a first end user device, the first message requesting selection by the device of a first notification time at which to receive at least one notification. The method also comprises the computer transmitting a second message to a second end user device, the second message requesting selection by the second device of a second notification time at which to receive at least one notification. The method also comprises the computer receiving a first response to the first message from the first end user device, the first response advising of a first selection of the first notification time. The method also comprises the computer receiving a second response to the second message from the second end user device, the second response advising of a second selection of a second notification time, the second notification time differing from the first notification time.

In an embodiment, a system for providing notifications is provided. The system comprises a processor, a memory, and an application stored in the memory. When executed on the processor, the application transmits a first message to a first end user device, wherein the first message requests selection by the device of a first notification time at which to receive at least one notification. The system also transmits a second message to a second end user device, wherein the second message requests selection by the second device of a second notification time at which to receive at least one notification. The system also receives a first response to the first message from the first end user device, wherein the first response provides a first selection of the first notification time. The system also receives a second response to the second message from the second end user device, wherein the second response provides a second selection of a second notification time, the second notification time differing from the first notification time.

In an embodiment, a method of providing notifications is provided. The method comprises a first electronic device receiving a first message requesting selection of a first notification time at which to receive at least one notification. The method also comprises the first electronic device, based on receipt of the first message, initiating a first session with a remote server. The method also comprises the first electronic device selecting the first notification time during the first session. The method also comprises a second electronic device, in response to receiving a second message requesting selection of a second notification time at which to receive at least one notification, selecting a second notification time during the second session, wherein the second notification time differs from the first notification time.

DETAILED DESCRIPTION OF THE INVENTION

Figure 1:
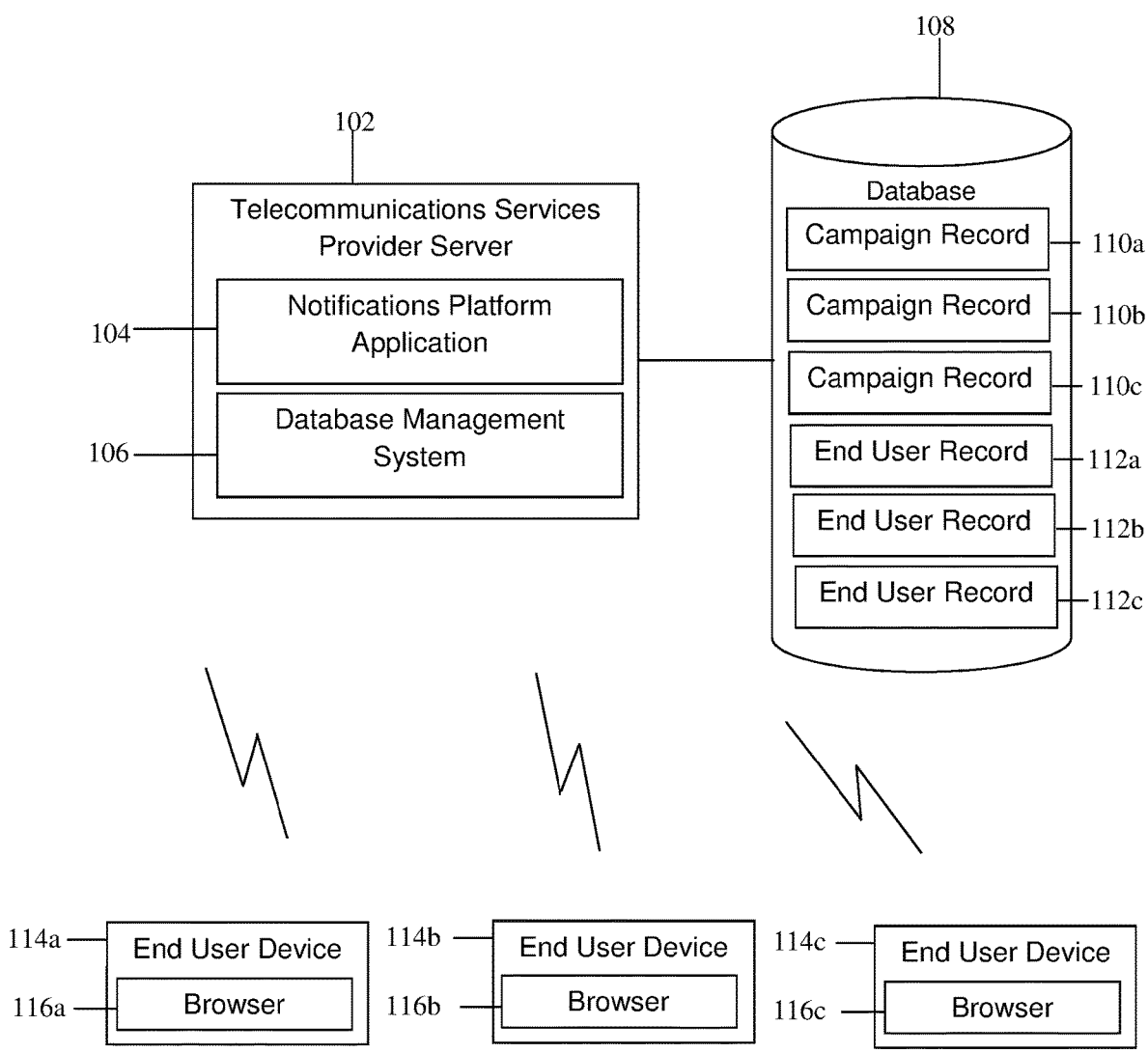
FIG. 1 is a block diagram of a system for providing notifications in accordance with an embodiment of the present disclosure.

Systems and methods provided herein promote at least two end user devices to receive notifications at different notification times. Notification times comprise specific times of day, for example 9:00 AM or 11:00 AM. The notification times may be specific to particular days of the week, such as Monday to Friday only, or specific days of the months, for example the 14th and 28th of each month or the second Tuesday of each month.

Two or more different end users receiving notifications may elect to be contacted at different specific times according to their own individual preferences. End users may configure more than one notification time, for example Wednesday at noon and Friday at 2:00 PM.

A web application that may be a progressive web app provides access to devices in possession of end users. The application prompts the end users to provide their selections as to when they wish to receive notifications. The end users reply and submit their selections. In embodiments, an end user may be subscribed to more than one campaign and may separately configure notification times for each campaign.

A campaign as provided herein is a strategy to serve notifications to end users. A telecommunications services provider may provide notification services for various clients. A client of the telecommunications services provider may have hundreds or thousands of customers or end users who periodically need to receive notifications for various reasons.

A chain of retail stores, for example, with many physical retail locations that include pharmacies may need to provide notifications to its customers when the customers' prescriptions are ready to be picked up. The retailer may contract with the telecommunications services provider for the provider to initiate contact with the retailer's customers, also referred to herein as end users, when their prescriptions are ready.

Such a program or business relationship between the retailer and the telecommunications provider is referred to herein as a campaign. Systems and methods provided herein allow for end users under a given campaign to specify different preferences for receiving notifications from the provider on behalf of the retailer or client of the provider.

A progressive web app is a front-end application that executes on the end-users device. The first notification sent out to end user devices is to let the customers know of this front end that allows them to change the notification settings in a back-end notification system. This front-end application uses web services to communicate to the back end.

A first end user under the campaign may, for example, reply that he/she only wishes to receive notifications at 4:00 PM. A second end user under the same campaign may reply that he/she only wishes to receive notifications at 9:00 AM. The end users may further specify days of the week on which they wish to receive notifications at these specific notification times, for example Mondays and Thursdays for the first end user and Tuesdays and Fridays for the second end user.

Progressive web apps are web applications that are regular web pages or websites, but may appear to the end user as traditional applications or native mobile applications. The application type attempts to combine features offered by most modern browsers with the benefits of a mobile experience. Mobile device users and desktop computer users will have the same experience.

A progressive web app such as that provided herein for communicating notifications is an Internet web page that may function similar to an Android or iOS mobile app. The PWA has many benefits of a native mobile app including push notifications, home screen launch icon, full screen experience, high responsiveness and offline usability. End user devices of the present disclosure need not download and install any extra software to access the progressive web app that receives notification time selections and later sends notifications per the selections.

As noted, a telecommunications service provider may forward notifications on behalf of a client, for example the large retailer described above. In embodiments, the provider may present web pages to end users using logos and other branding indicia of the retailer such that the identity of the service provider is not known and actions of the web pages appear to be those of the retailer. End users may make entries for notification times and methods to receive notifications in the belief they are dealing directly with the retailer, adding value to the interaction.

Turning to the figures, FIG. 1 is a block diagram of a system for distribution of notifications according to an embodiment of the present disclosure. FIG. 1 depicts components and interactions of a system 100.

System 100 comprises a telecommunications services provider server 102, referred to hereinafter for brevity purposes as the server 102. System 100 also comprises a notification platform application 104, referred to hereinafter for brevity purposes as the application 104. System 100 also comprises a database management system 106, a database 108, campaign records 110a, 110b, 110c, end user records 112a, 112b, 112c, end user devices 114a, 114b, 114c, and browsers 116a, 116b, 116c.

The server 102 is a computer system and may in some embodiments comprise more than one physical computer. In embodiments, portions of the server 102 may be situated at more than one physical location.

The application 104 executes on the server 102 and initiates contact with end user devices 114a-c. Based on a campaign record 110a-c which describes a campaign, the application 104 advises the end user devices 114a-c to make selections regarding at least one notification time at which the application 104 may send notifications under the campaign. As noted, the application 104 may be a progressive web app that facilitates the end user devices 114a-c to have a better experience when in sessions with the application 104 and the server 102.

The server 102 and the application 104 executing thereon may be operated by a telecommunications services firm that provides messaging, notification and other services to various clients. The services may be provided on a "private label" or "back office basis" such that notification services are provided directly to end users of the clients but with the appearance that the clients are performing the services, not the telecommunications services firm.

In the example described above, the large retailer with thousands of pharmacy customers is the client. The pharmacy customers possess end user devices 114a-c such as mobile telephones. The telecommunications services firm operates the server 102 and application 104 executing thereon. The campaign is associated with the client. In this example, the campaign is the arrangement the services provider and the client have together for the services provider to send notifications to the end user devices 114a-c when users of the devices 114a-c have ordered prescriptions that are ready to be picked up.

In another example, the client may be a cable television company that occasionally experiences service outages and wishes to notify its customers of these events and when to expect service to be restored. The cable company may contract with the telecommunications services provider for the provider to send service notifications at the times and in the manners requested by the customers.

In yet another embodiment, the telecommunications service provider may make its notification services available to medical and dental practices that have patients who need to be provided notifications about upcoming appointments as well as payments due. In such embodiments, a practice management system used by the medical and dental practices may contract with the telecommunications services provider.

The practice management system and the telecommunications services provider may work together to assure that patients of the medical and dental practices are sent notifications at notification times selected by the patients and using selected notification methods, for example text messaging or voice messaging.

Stored in the database 108 are campaign records 110a-c which describe campaigns. Also stored in the database 108 are end user records 112a-c which describe end users and their end user devices 114a-c.

Campaign records 110a-c specify the notification channels that are available for notifications sent under a given campaign. Campaign records 110a-c also specify the content to be delivered to a contact point via those channels (recorded voice, live agent voice, SMS (text), user interaction, and decision logic).

The end user records 112a-c describe individual end users and the campaigns to which the end users are subscribed. The end user records 112a-c store selections by end users of notification times for each campaign a particular end user is subscribed to as well as the end users' selected notification methods for each campaign. The end user records 112a-c store contact points for each notification time and associated notification method. Contact points comprise phone numbers for text messaging and voice messaging and electronic mail address for such messaging. The present disclosure is not limited to such notification methods and may provide for other types of messaging to be used to send notifications to end user devices 114a-c. The end user devices 114a-c each have browsers 116a-c, respectively, installed and available for accessing the application 104 to enter selections of notification times, messaging methods and associated contact points.

Some notifications may be purely informational, such as a cable provider, highway traffic information provider, or mass transit authority advising of disruptions. Other notifications may request or require specific action such as payment on an outstanding account or confirmation of an appointment.

Systems and methods provided herein may be configured to plug into some preference management systems used by persons or groups to configure preferences for receiving notifications. Systems and methods provided herein may also be configured to plug into some formal third-party messaging systems.

In some embodiments, the application 104 may be configured to send notifications of employees of the client in addition to or instead of sending notifications to customers of the client. In the example above of a large retailer having the telecommunications services provider send notifications to pharmacy customers when their prescriptions are ready, the retailer may also arrange for the provider to send notifications to the retailer's pharmacists. Such notifications to the pharmacists may be purely informational such as material about new medications or may call for action such as requiring pharmacists to read certain material and reply that they have completed such review.

Figure 2:
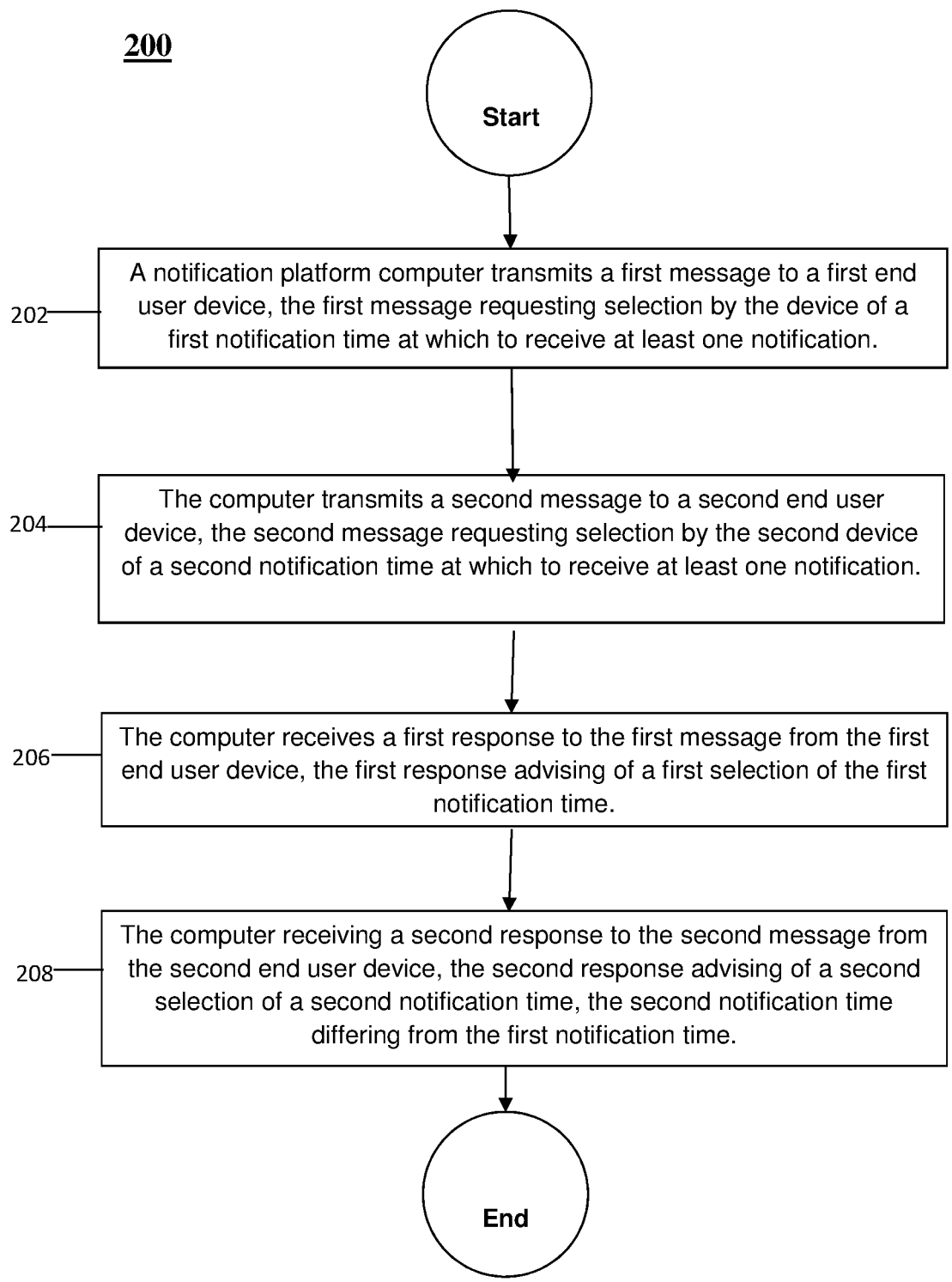
FIG. 2 is a flowchart of a method of providing notifications in accordance with an embodiment of the present disclosure.

FIG. 2 is a flowchart of a method of providing notifications in accordance with an embodiment of the present disclosure. FIG. 2 illustrates a method 200 that may use the components provided by the system 100.

Beginning at block 202, a notification platform computer transmits a first message to a first end user device, the first message requesting selection by the device of a first notification time at which to receive at least one notification. At block 204, the computer transmits a second message to a second end user device, the second message requesting selection by the second device of a second notification time at which to receive at least one notification.

At block 206, the computer receives a first response to the first message from the first end user device, the first response advising of a first selection of the first notification time. At block 208, the computer receives a second response to the second message from the second end user device, the second response advising of a second selection of a second notification time. The second notification time differs from the first notification time. The method 200 thereafter ends.

Figure 3:
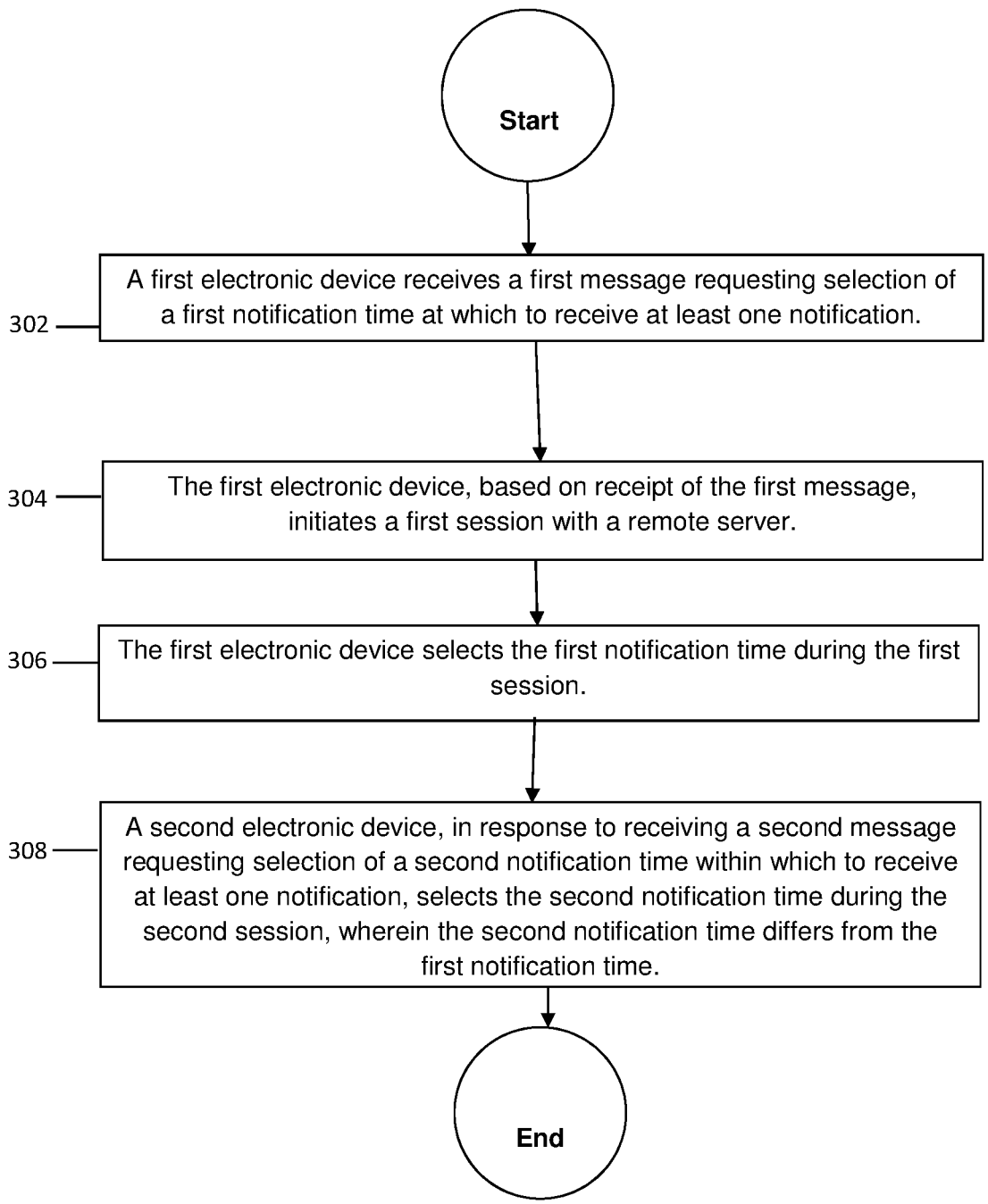
FIG. 3 is a flowchart of a method of providing notifications in accordance with an embodiment of the present disclosure.

FIG. 3 is a flowchart of a method of providing notifications in accordance with an embodiment of the present disclosure. FIG. 3 illustrates a method 300 that may use the components provided by the system 100.

Beginning at block 302, a first electronic device receives a first message requesting selection of a first notification time at which to receive at least one notification. At block 304, the first electronic device, based on receipt of the first message, initiates a first session with a remote server.

At block 306, the first electronic device selects the first notification time during the first session. At block 308, a second electronic device, in response to receiving a second message requesting selection of a second notification time at which to receive at least one notification, selects a second notification time during the second session. The second notification time differs from the first notification time. The method 300 thereafter ends.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Figure 4:
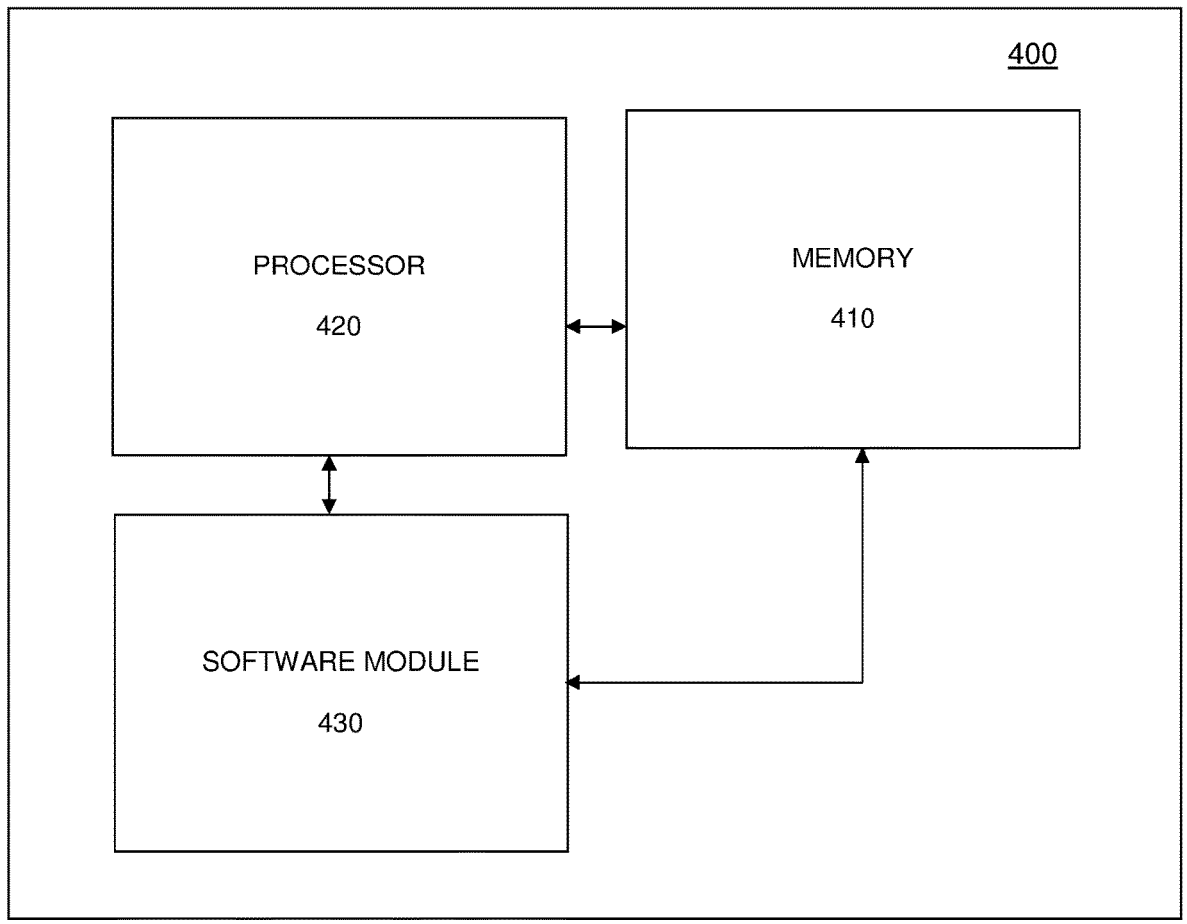
FIG. 4 is a block diagram of a system for providing notifications in accordance with an embodiment of the present disclosure.

FIG. 4 is a block diagram of a system for providing notifications in accordance with an embodiment of the present disclosure. FIG. 4 illustrates an example network element 400, which may represent any of the above-described network components of the other figures.

As illustrated in FIG. 4, a memory 410 and a processor 420 may be discrete components of the network entity 400 that are used to execute an application or set of operations. The application may be coded in software in a computer language understood by the processor 420, and stored in a computer readable medium, such as, the memory 410. Furthermore, a software module 430 may be another discrete entity that is part of the network entity 400, and which contains software instructions that may be executed by the processor 420. In addition to the above noted components of the network entity 400, the network entity 400 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components.

Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   accessing end user records associated with a first end user and a second end user to identify campaigns subscriptions of the first and second end users;
   accessing a campaign record of a software application which comprises a campaign of the software application which defines notification instructions, defines notification channels to be used for notifications sent under the campaign, and defines content to include in the notifications, for each of a first end user device corresponding to the first user and a second end user device corresponding to the second user;
   executing, by a notification platform computer, instructions corresponding to a progressive web app (PWA), to transmit a first message to the first end user device based on the information stored in the campaign record, the first message requesting selection by the device of a first notification time;
   transmitting, by the notification platform computer, a second message to the second end user device based on the information in the campaign record, the second message requesting selection by the second device of a second notification time;
   receiving, by the notification platform computer, a first response to the first message from the first end user device, the first response advising of a first selection of the first notification time to receive the at least one notification under the campaign;
   receiving, by the notification platform computer, a second response to the second message from the second end user device, the second response advising of a second selection of a second notification time to receive the at least one additional notification under the same campaign, the second notification time differing from the first notification time;
   generating, by the notification platform computer, at least one notification from the software application based on the campaign record, where the generating comprises integrating branding indicia associated with the software application into the at least one notification such that the at least one notification appears as if it is sent by the software application; and
   sending the at least one notification with the branding indicia integrated therein to the first end user device at the first notification time and to the second end user device at the second notification time under the same campaign.

2. The method of claim 1, wherein the first and second notification times comprise designated times on at least one designated day of a week.

3. The method of claim 1, further comprising offering multiple times of day for receiving notifications.

4. The method of claim 1, further comprising sending the one or more notifications at the first and second notification times via methods chosen by the first and second users, respectively, the methods comprising at least one of electronic mail, text message, voice message, and social media message.

5. The method of claim 1, further comprising transmitting information to the first and second user devices providing options for selecting multiple notification times when subscribed to more than one campaign.

6. A system, comprising:
- a processor,
- a memory; and
- instructions including ones corresponding to a progressive web application stored in the memory, the instructions when executed on the processor causing the processor to:
  - access end user records associated with a first end user and a second end user stored in the memory to identify campaigns subscriptions of the first and second end users;
  - access a campaign record of a software application in the memory which comprises a campaign of the software application which defines notification instructions, defines notification channels to be used for notifications sent under the campaign, and defines content to include in the notifications, for each of a first end user device corresponding to the first user and a second end user device corresponding to the second user;
  - transmit a first message to the first end user device based on the information stored in the campaign record, wherein the first message requests selection by the device of a first notification time at which to receive at least one notification,
  - transmit a second message to the second end user device based on the information stored in the campaign record, wherein the second message requests selection by the second device of a second notification time,
  - receive a first response to the first message from the first end user device, wherein the first response provides a first selection of the first notification time to receive the at least one notification under the campaign,
  - receive a second response to the second message from the second end user device, wherein the second response provides a second selection of a second notification time to receive the at least one additional notification under the same campaign, the second notification time differing from the first notification time,
  - generate at least one notification for the software application based on the campaign record, where the generating comprises integrating branding indicia associated with the software application into the at least one notification such that the at least one notification appears as if it is sent by the software application directly; and
  - send the at least one notification with the branding indicia integrated therein to the first end user device at the first notification time and to the second end user device at the second notification time under the same campaign.

7. The system of claim 6, wherein the first and second notification times comprise designated times of day on at least one designated day of a week.

8. The system of claim 6, wherein the processor is configured to send the one or more notifications at the first and second notification times via at least one of electronic mail, text message, voice message, and social media message.

9. The system of claim 6, wherein the processor is configured to provide listings to the first and second end user devices of campaigns to which the first and second users are subscribed, respectively.

10. The system of claim 6, wherein the processor is configured to provide the first and second end user devices with options for selection of multiple notification times under the first campaign.

* * * * *